United States Patent [19]

Waterbury

[11] Patent Number: 4,733,383

[45] Date of Patent: Mar. 22, 1988

[54] COMBINED DIGITAL AND ANALOG TIMEPIECE AND RADIATION MONITOR ASSEMBLY

[76] Inventor: Nelson J. Waterbury, 211 E. 70th St., New York, N.Y. 10021

[21] Appl. No.: 933,129

[22] Filed: Nov. 21, 1986

Related U.S. Application Data

[63] Continuation-in-part of Ser. No. 907,827, Sep. 16, 1986.

[51] Int. Cl.⁴ .............................................. G04B 47/00
[52] U.S. Cl. .................................................... 368/10
[58] Field of Search .................... 368/10, 11; 250/370, 250/526

[56] References Cited

U.S. PATENT DOCUMENTS 4,461,952  7/1984  Allemand et al. ............... 250/370 F
4,605,858  8/1986  Terhune .............................. 250/374
4,608,655  8/1986  Wolf et al. ............................ 368/10

Primary Examiner—Bernard Roskoski
Attorney, Agent, or Firm—Michael Ebert

[57] ABSTRACT

A portable electronic timepiece and radiation monitor assembly formed by a timekeeping section so linked to a radiation monitoring section that the user is provided not only with a time display but also with a reading of the existing level of penetrating radiation to which he is exposed. The timekeeping section includes a stable, high-frequency time base from which is derived low-frequency timing pulses that serve to actuate an analog or digital time display. The radiation monitoring section includes electronic means such as a microprocessor coupled to a radiation detector yielding signal currents or pulses at a rate depending on the existing intensity of radiation. These electronic means are responsive to clock pulses from the timekeeping section to determine the number of radiation pulses yielded within a fixed time interval to provide a radiation intensity value whose magnitude is indicated on a radiation intensity display. In one preferred embodiment of the assembly realized in a wrist watch format, these radiation intensity values are stored in a special memory of the microprocessor and accumulated therein to provide on a radiation digital time display a reading in terms of RAD's or other radiation measurement units giving the cumulative dosage to which the wearer has been subjected.

18 Claims, 15 Drawing Figures

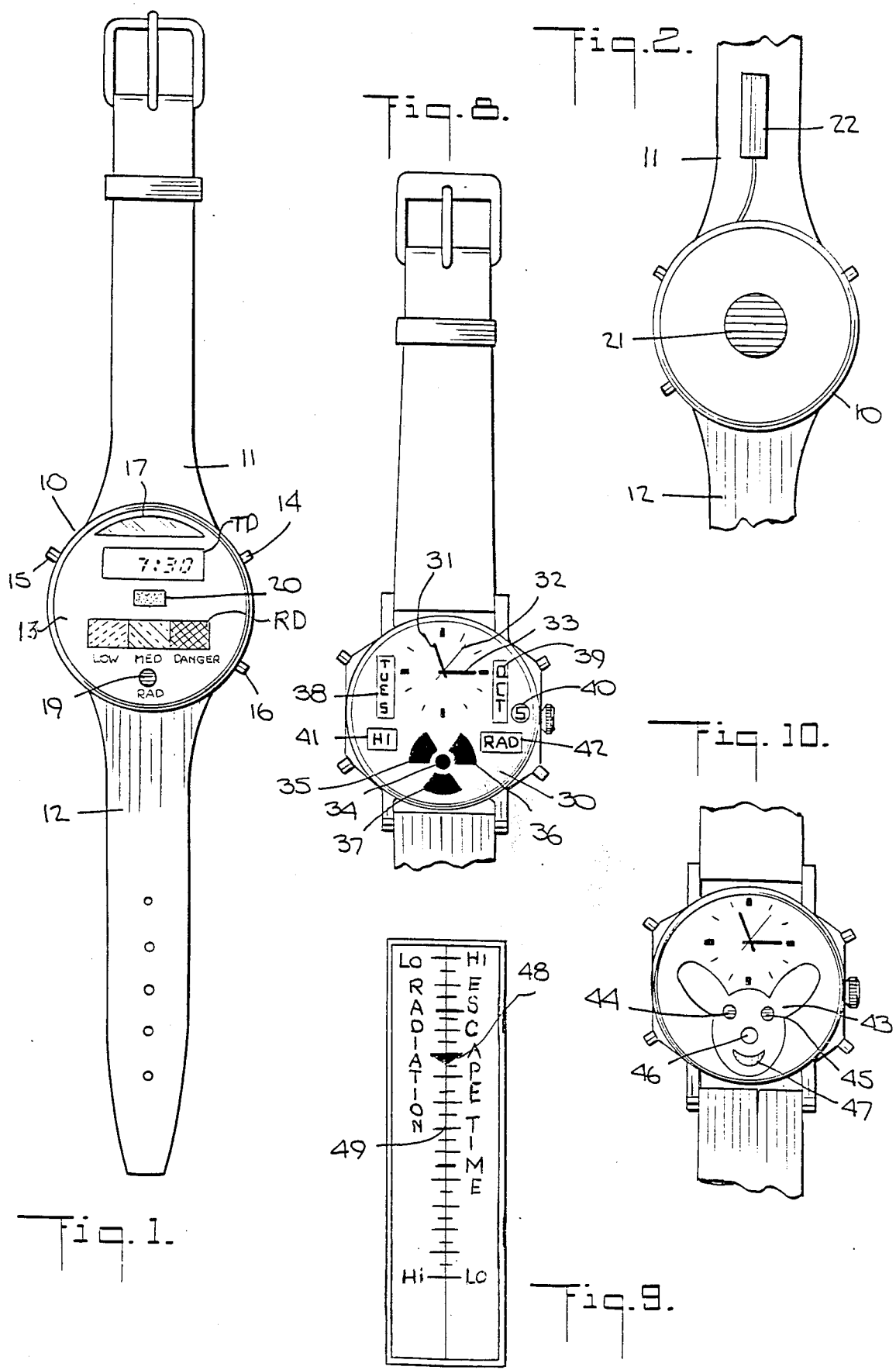

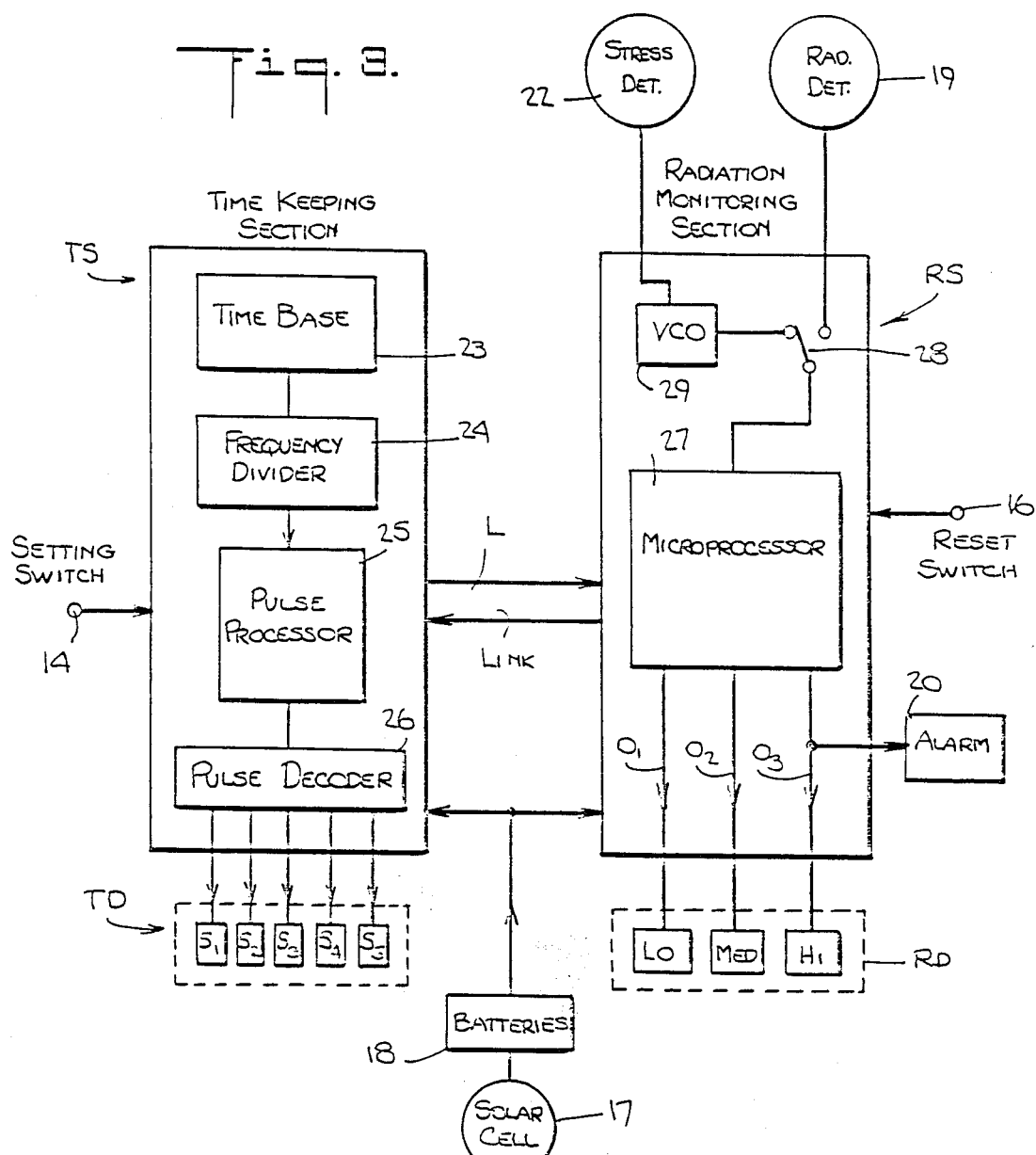
Fig. 3.
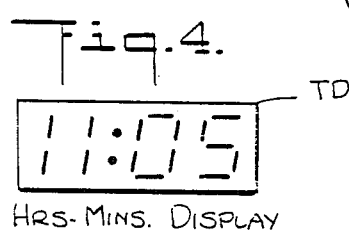
Fig. 4. Hrs-Mins. Display
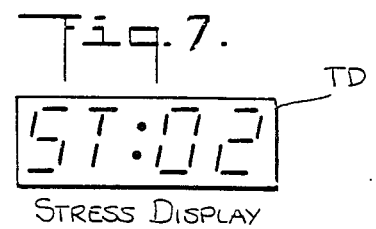
Fig. 7. Stress Display
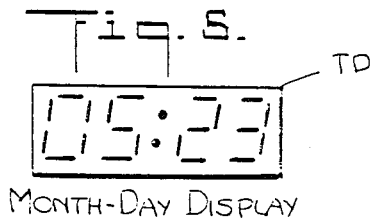
Fig. 5. Month-Day Display
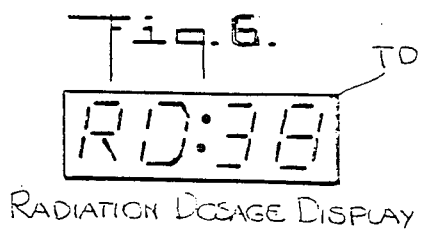
Fig. 6. Radiation Dosage Display

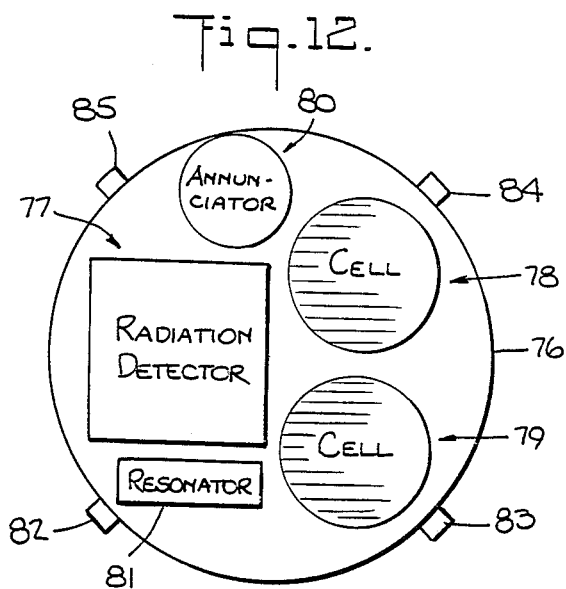
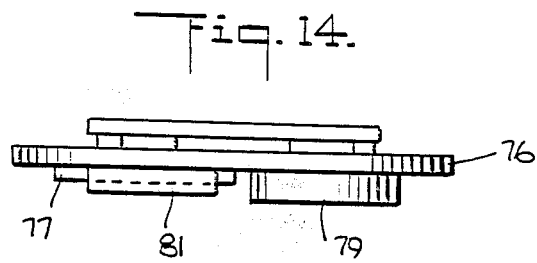
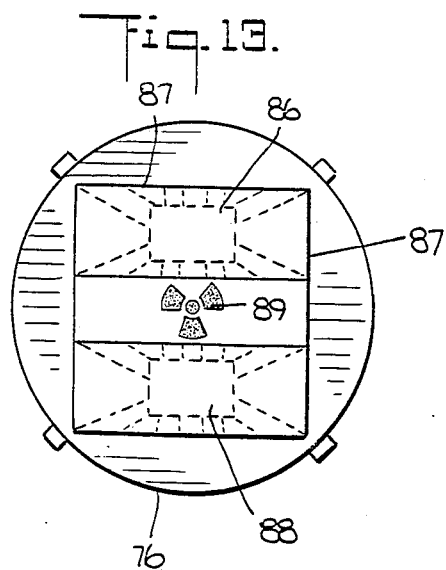
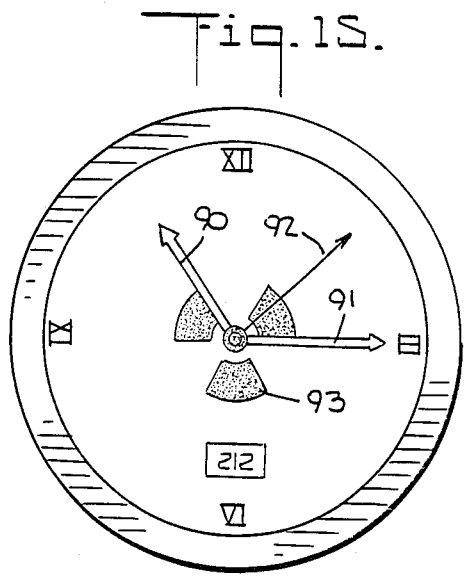

COMBINED DIGITAL AND ANALOG TIMEPIECE AND RADIATION MONITOR ASSEMBLY

RELATED APPLICATION

This application is a continuation-in-part of my copending application of the same title, Ser. No. 907,827, filed Sept. 16, 1986, whose entire disclosure is incorporated herein by reference.

BACKGROUND OF INVENTION

1. Field of Invention

This invention relates generally to an electronic timepiece and radiation monitor assembly which indicates time and also the intensity of radiation to which the user is exposed, and in particular to a wrist watch and radiation monitor assembly in which the timekeeping components cooperate symbiotically with radiation monitoring components whereby the watch not only displays time and other time related data, but also indicates the existing intensity of penetrating radiation to which the wearer is exposed and the accumulated dosage thereof.

2. Status of Prior Art

The keeping of time by means of electronic timepieces, and the monitoring of radiation by means of geiger counters or other radiation detectors both involve pulse counting procedures. A timekeeper and a radiation monitor together afford data vital to a person living in a period in which virtually all activity is time scheduled and is carried out in an environment that may contain dangerous levels of radioactivity.

In the present invention, the functions of timekeeping and radiation monitoring are integrated into a single portable instrument which may be wrist-borne or otherwise carried on the person. Hence for background purposes, we shall first separately consider these functions, and then explain why it is desirable to integrate them into a single, highly compact instrument.

When exposed to X-rays, gamma rays or other forms of penetrating radiation such as radiation fallout following a nuclear test or accident, living organisms then become subject to the damaging effects of such radiation. These effects are collectively referred to as radiation hazards. The concern with radiation hazards is growing and is now international in scope, and it continues to intensify because of recently highly-publicized incidents.

Thus, the catastrophe at Chernobyl resulting from a malfunction at a nuclear power plant produced radioactive fallout whose boundaries extended from beyond those of the USSR. And the Three Mile Island disaster in Pennsylvania was by no means limited in its consequences to this state. Nor is the presence of hazardous radon gas limited to any one geographical region.

The present recommendation of the United States National Committee on Radiation Protection is that the permissible gamma dose should not exceed 300 milliroentgens per week with a maximum daily exposure of 100 milliroentgens. Assuming a 40 hours work week for personnel in the radiation industry, 300 MR/week equals 7.5 MR/hr. An ability to detect radiation at about one-tenth this rate is normally considered necessary for personnel monitoring. One roentgen/hour is approximately equivalent to one rad/hour.

Because gamma rays deposit energy in an absorbing medium in a way which is dependent upon their energy, a given radiation dosage is effected with different amounts of gamma rays of one energy compared to another energy. For example, it requires approximately $5(10)^4$ gammas/sec/cm$^2$ (at 0.1 MEV) to produce 60 milliroentgens in 8 hours (7.5 MR/hr) compared to $4(10)^3$ gammas/sec/cm$^2$ at 1 MEV. The 1 MEV gammas deposit approximately 10 times the energy in an absorbing medium as do the 0.1 MEV gammas. Because gamma rays are absorbed exponentially in material—that is $I=I_o(1-e^{-\mu x})$—for a given incident flux of $I_o$ and an absorption factor $\mu$, the resultant absorbed intensity I can be calculated for any material thickness X. The absorption coefficient fo 0.1 MEV gammas is approximately 0.1/cm and therefore for a $2.8(10)^{-3}$ cm thick solid state detector, an incident intensity of 7000 gammas/sec/cm$^2$(1 MR/hr) and a 1 cm$^2$ detector, the number of absorbed gammas is 1.75/sec.

Because high speed (high count rate) amplifiers require more power than low speed designs, an upper counting rate limit of $10^4$ counts/sec is dictated by our low power watch battery constraint. This rate would be equivalent to approximately 5 r/hour however, and therefore gamma and x-ray detection is possible over a wide dynamic range from 1 MR/hour to 5 r/hour.

The human sensory organs are highly responsive to light, sound and other stimuli, but are generally insensitive to penetrating radiation. It is for this reason that one may receive a lethal dose of radiation without in any way feeling it. Various forms of cancer are induced by excessive exposure to radiation without the individual experiencing any sensation. The biological consequences of radiation take either a genetic or a somatic form. Only low levels of radiation are needed to effect genetic mutations or alterations in heredity, an these only show up in future generations. With somatic injury, the effects of radiation is on the individual's body cells.

The increasing use of X-rays in medical and dental diagnosis, the rising amount of waste products from nuclear power facilities, and the widespread industrial applications for radioactivity make it more necessary than every to monitor the the radioactivity to which an individual is subjected. There is scarcely any environment today which is altogether free of penetrating radiation. Thus, typical homeowners have reason to be concerned about radiation in the vicinity of their TV sets or microwave ovens, and possibly radon gas emanating from the ground on which their houses are anchored. And, of course, if a home is situated in the vicinity of a nuclear power plant, there is greater cause for anxiety.

Various standards or radiation units are now used to measure the intensity of radiation emitted by radioactive nuclei. The "curie" measures the rate at which radioactive material emits radiation. A sample is said to have an activity of one curie if $3.7(10)^{10}$ of its nuclei disintegrate in one second.

The "roentgen" is a measure of the energy deposited in a region through which radiation has passed. When electrically-charged particles produced by radioactive nuclei pass through a medium, they knock electrons out of the atoms in their path to create ions, and the number of ions so produced is proportional to the total energy deposited. The dosage is said to be one roentgen if $2.08(10)^9$ ions are produced in one CM$^3$ of air. A typical dental X-ray examination of the jaw delivers 5 roentgens. Since ionization within biological cells can kill these cells, there are now strict safety standards set for X-ray dosages.

Other radiation dosage units are predicated on the energy absorption corresponding to irradiating body tissue by one roentgen of X-radiation. Thus, the roentgen equivalent physical unit, abbreviated as REP, corresponds to the energy absorption of 93 ergs/gram by tissue through which ionizing radiation passes. The REP unit has been replaced by the RAD unit, and this corresponds to energy absorption of 100 ergs/gram of body tissue.

Relative biological effectiveness (RBE) is a weighting factor that is equal to unity for X-rays. RBE expresses the degree to which a given amount of radiation is more or less effective in producing a biological effect than X-rays of the same RAD. The "roentgen equivalent mammal" (REM) unit, defined originally in terms of the REP, is the amount of any given radiation producing the same effect as one REP of X-rays. The current definition of REM is one REM equals [1/RBE]-RAD.

Radiation monitors which make use of geiger counters and other radiation detectors are well known. Thus, the Snaper et al. U.S. Pat. No. 4,482,442 senses ionizing radiation by means of a geiger counter whose pulses are applied to a processor to provide radiation intensity and dosage readings. When a charged particle traverses a geiger counter, an electrical pulse is produced, the count rate being an index to the intensity of radiation.

The Waechter et al. U.S. Pat. No. 4,536,841 discloses a battery-operated portable dosimeter using a microprocessor coupled to a neutron detector to calculate and display the accumulated dosage. A similar arrangement is disclosed in the Mastain et al. U.S. Pat. No. 4,480,311. Also of background interest is the Waechter et al. U.S. Pat. No. 4,550,381.

The term "solid state watch," as used herein, is limited to timepieces having an electro-optic time display and no moving parts. In a typical solid state watch such as that disclosed in the Sagarino U.S. Pat. No. 4,033,110, low-frequency electrical pulses derived from a high-frequency piezoelectric crystal-controlled time base serve to actuate a multi-station display formed by light-emitting diodes (LED) or by liquid-crystal display elements (LCD).

In such solid state watches, the output of the crystal-controlled oscillator is fed to a frequency converter formed by a chain of frequency-divider stages. The low-frequency timing pulses yielded by the converter are applied to a miniature microprocessor or time computer that counts the input train of pulses, encodes it in binary form and then decodes and processes the resultant data to provide appropriate activating signals for the LCD or LED display stations.

In the modern multi-mode solid state wrist watch, the arrangement is such as to provide calendar as well as time readings. Thus, the watch in one mode will display the existing time, say, 12:30 AM, and in another mode, the month and date, say, 05:23, meaning the 23rd day of May.

A multi-mode solid state watch of this type produces one pulse per second to provide a minute indication when sixty second pulses are counted, and to provide an hour indication when 3600 second pulses are counted. It produces a change in date when 3600×24 pulses are counted, and a change in month when 3600×24×28 pulses, or 3600×24×30 pulses, or 3600×24×31 pulses are counted.

Where an analog display is required, the electronic watch also includes a time base and a frequency divider which yields one pulse per second, but these pulses are applied to a stepping motor which drives the gear train that turns the analog hands of the watch. In some cases, a modern electronic watch will include both digital and analog displays, the former being used to provide calendar indications.

Almost everybody today wears a wrist watch so that he can keep tabs on the time and schedule his activity accordingly. But while many of these same persons are cognizant of the hazards of radiation, unless they are working in an environment known to present significant radiation problems, such as a medical diagnostic laboratory, they do not also have on their person a radiation monitor.

One practical reason for the general absence of radiation monitors in a world concerned with radiation hazards is that even those battery-powered monitors which are classified as portable are relatively bulky and conspicuous. Thus, while in a medical X-ray laboratory, one would expect to have a radiation monitor available, a person visiting an office, a home or any industrial plant would find it embarrassing to be seen carrying along a radiation monitor. Moreover, commercially available radiation monitors are not waterproof and cannot be immersed in a liquid to determine whether the liquid is radioactive, even though some water supplies have been found to exhibit radioactivity.

Yet, as previously pointed out, because of the prevalence of penetrating radiation from various man-made and natural sources, individuals today have reason to be concerned not only with the existing intensity of radiation to which they are exposed, but they have greater reason to be worried about long-term cumulative effects. While in the course of any day an individual may only receive a small dose of penetrating radiation (even our Sun periodically emits bursts of penetrating radiation), over a period of, say, one to three years, the cumulative dosage may be considerable and approach a dangerous total. The typical portable radiation detector does not give long term cumulative dosage values.

Also, where high levels of radiation are detected, for example, because of leakage in an industrial plant, it is important for individuals who carry the detector to know how much time they have to escape from this environment in order to avoid an excessive dosage. Such information is not furnished by the ordinary monitor.

SUMMARY OF INVENTION

In view of the foregoing, the main object of the invention is to provide an electronic timepiece and radiation monitor assembly which provides its user not only with a time display but also with a reading of the existing level of penetrating radiation to which the user is exposed. The assembly in its preferred embodiment is in a wrist watch format so that the user wears the instrument at a position where it may readily be consulted. It can also be in a clock format for mounting on a wall or placement on a table or shelf.

A salient advantage of the invention is that it dispenses with the need for a separate radiation monitor, for the assembly incorporates a radiation monitoring section that is symbiotically linked to a timekeeping section to provide radiation readings as well as time and time-related indications and other data relevant to the user's well being.

Also an object of the invention is to provide an assembly of the above type which also produces a reading of the cumulative radiation dosage to which the user has been subjected from the time monitoring is initiated to the time this dosage reading is given.

Another object of the invention is to provide an audible alarm when the existing intensity of radiation reaches a hazardous level, which alarm may take the form of a verbal warning.

Yet another object of the invention is to provide an assembly of the above type which includes a sensor responsive to a physiological body variable that represents the existing level of stress or another human variable, such as galvanic skin potential, Ph factor or body temperature, and to display on demand, a reading thereof.

Another advantage of a timekeeping and radiation monitor assembly in a wrist-watch format in accordance with the invention is that it is housed in a waterproof case, making it possible to obtain readings of radiation intensity level in liquids as well as in gaseous media.

Briefly stated, in one preferred embodiment of the invention, these objects are attained in a solid state wrist watch and radiation monitor assembly formed by a timekeeping section so linked to a radiation monitoring section that the wearer is provided not only with a time and calendar display but also with a reading of the existing level of penetrating radiation to which the wearer is exposed as well as a reading of the cumulative dosage to which the wearer has been subjected from the time monitoring is initiated. The timekeeping section includes a stable, high-frequency time base from which is derived low-frequency timing pulses. These are supplied to a pulse processor yielding seconds, minutes, hours, days and months pulses that are applied through a decoder to a digital time display.

The radiation monitoring section includes electronic means such as a microprocessor coupled to a radiation detector yielding signal currents or pulses at a rate depending on the existing intensity of radiation, the electronic detector circuits receiving clock pulses from the timekeeping section to determine the number of radiation pulses yielded within a fixed time interval to provide a radiation intensity value whose magnitude is indicated on a radiation intensity display. These radiation intensity values are stored in the memory of the circuitry and accumulated therein to provide on the time display, a reading in terms of RAD's or other radiation measurement units, of the cumulative dosage to which the wearer has been subjected.

OUTLINE OF DRAWINGS

For a better understanding of the invention as well as other objects and further features thereof, reference is made to the following detailed description to be read in conjunction with the accompanying drawings, wherein:

FIG. 1 illustrates in front view a wrist watch and radiation monitor assembly in accordance with the invention;

FIG. 2 is a rear view of the assembly;

FIG. 3 is a block diagram of the timekeeping section, the radiation monitoring section and the other components of the assembly;

FIG. 4 illustrates a typical time indication as seen on the time display of the assembly;

FIG. 5 shows a typical calendar indication;

FIG. 6 shows a typical cumulative radiation reading as it appears on the time display;

FIG. 7 illustrates a typical person stress indication as it appears on the time display;

FIG. 8 shows another embodiment of a wrist watch and

FIG. 9 shows a nomographic radiation display;

FIG. 10 shows a character wrist watch assembly in accordance with the invention;

FIG. 12 is a rear view of a mounting substrate for an assembly in accordance with the invention;

FIG. 13 is a front view of the substrate;

FIG. 14 is an edge view of the substrate; and

FIG. 15 shows the dial of a clock assembly having a radiation indicator in standard symbol form.

DESCRIPTION OF INVENTION

First Embodiment

Figure 11:
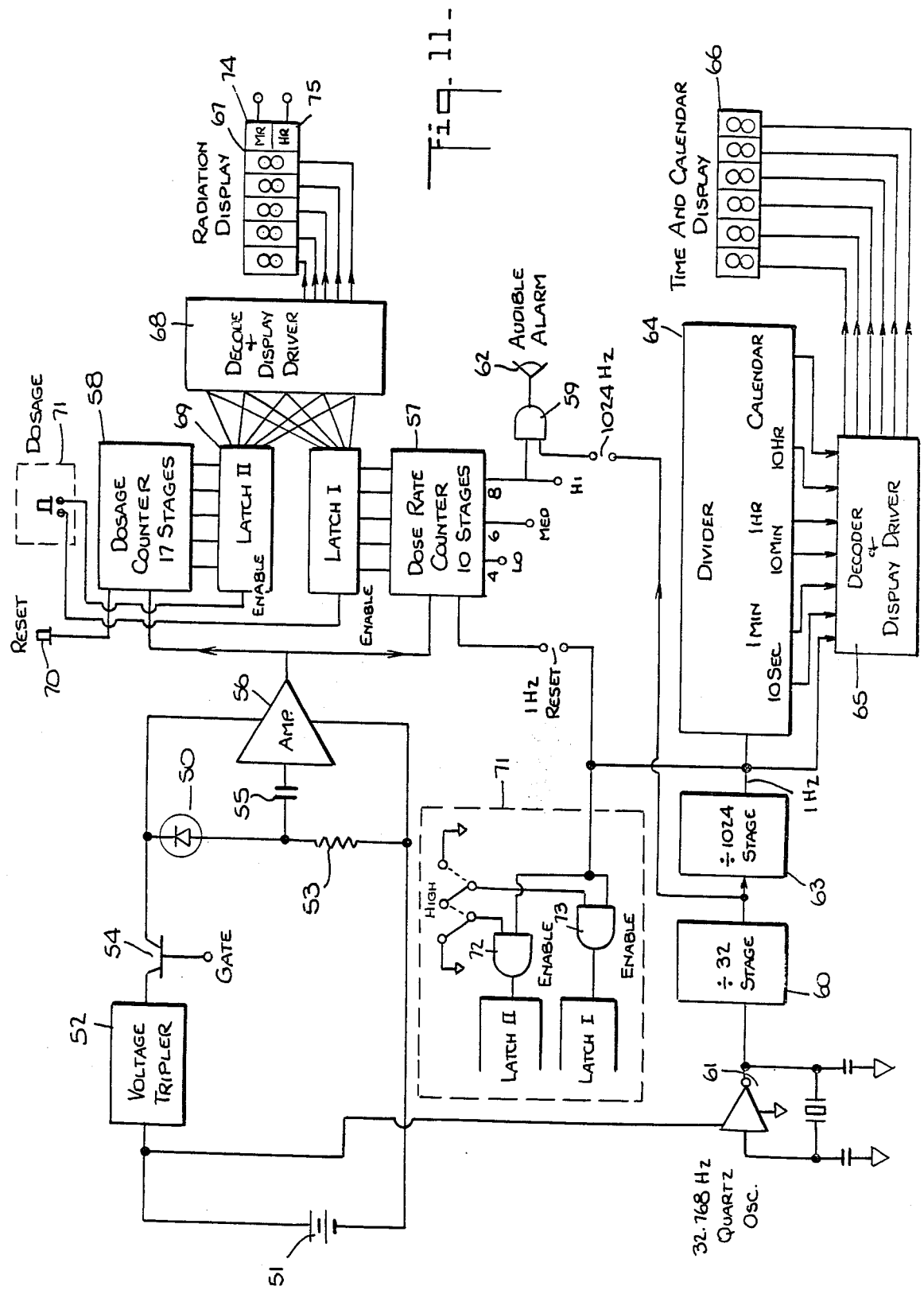
FIG. 11 is a block diagram of another embodiment of the assembly in which the radiation monitoring section is defined by a counter arrangement.

Referring now to FIG. 1 showing one preferred embodiment of a wrist watch and radiation monitor assembly in accordance with the invention, the assembly includes a case 10 having conventional leather or plastic elements 11 and 12 attached thereto for strapping the assembly onto the wrist of a wearer. The dial face 13 of the watch is covered by a transparent crystal (not shown). The watch is preferably of waterproof construction so that it can be immersed in liquids, if one wishes to sense and indicate the extent of radioactivity therein. The assembly is usable as a radiation monitor which is effective regardless of the source of radiation (solid, liquid or gaseous). As used herein, the term "waterproof" means that the instrument, whatever its format, can be safely immersed at depths well below sea level as great as 600 feet.

Mounted on transparent face 13 is a five-station alphanumeric time display TD. The individual stations of this display are formed by segmented LCD elements which can be selectively excited to form the digits 0 to 9, or to form alphabetic letters.

The pattern of seven segments is such that when all the vertical and horizontal segments are excited, this results in the formation of the number 8, whereas when all segments other than the two left side vertical segments are excited, this forms the number 3. Letter A is produced by exciting all segments other than the lower horizontal segments, and other letters are produced by selecting for excitation those segments which create the desired alphabetical letter.

For a more detailed description of an alphanumeric seven-segment LED or LCD display, and for a disclosure of the components which constitute the movement of a solid state watch having a digital display for time and for calendar indications, reference is made to the Bennett et al. U.S. Pat. No. 4,033,108. The present assembly includes a solid state timekeeping section which may be of the type disclosed in this patent; hence this section will not be described in detail and its components will only be disclosed in general terms. The present invention makes use of any standard form of solid state timekeeping movement. The invention does not reside in this movement, but in a cooperative symbiotic relationship thereof to a radiation monitoring section.

Projecting from one side of case 10 is an actuator button 14 to effect setting of the time and calendar display, and an actuator button 15 to effect a reset of the radiation monitoring section, so that the wearer of the assembly can initiate the accumulation of radiation data to provide on the time display a reading of the cumulative radiation dosage to which the wearer is exposed from the time at which monitoring is initiated to the time a dosage reading is displayed.

Where a watch case is provided with buttons or control shafts which project therethrough, this makes it difficult to waterproof the watch so that it remains sealed even when immersed at a relatively great depth. To provide a watch assembly capable of maintaining its seal under high pressure conditions, all controls may be effected by slidable magnetic elements on the exterior of the case which are magnetically coupled to follower elements in the case interior.

Positioned below time display TD on face 13 of the watch is a three-station radiation intensity display RD. When excited, the left station indicates low intensity radiation Low, the middle station indicates medium intensity radiation Med, and the right station, high intensity radiation Danger. In practice, these stations may be formed by chromatic LED elements or reflective-opaque LCD elements which are normally reflective and become opaque or change color when a voltage is applied thereto, the color depending on the magnitude of the applied voltage. Or the RD display may be in the form of an LCD having a row of parallel bars which are selectively excited to provide a moving pointer with respect to a scale that can be color graduated so that when the pointer is in a green zone, this indicates a low radiation level, and when in a yellow zone, this indicates medium level radiation, this being followed by a red danger zone.

The radiation intensity display need not be in the form of color elements, but this type of presentation is preferred, for it can be quickly understood. Thus, Low may take the form of a chromatic green LED, Med by a yellow LED, and Danger by a red LED. Hence the wearer seeing a red indication is immediately made aware that the existing radiation intensity is dangerous. Since LED's draw far more current than LCD elements, in order to conserve battery power, a button 16 is provided which, when pressed, switches "on" the radiation intensity display which is otherwise "off." But when the radiation display is of the non-caloric LCD or any other type that draws very little current when excited, it may be made to operate continuously.

Placed above time display TD on the face of the watch is a solar cell 17 which when exposed to light generates an electrical voltage. This voltage is applied to a set of miniature rechargable batteries 18 (see FIG. 3) housed within case 10 of the assembly. Assuming that the watch is often exposed to sunlight or strong artificial light, the solar cell in combination with rechargeable batteries has an indefinite operating life. The output of the solar cell depends on the dimensions of its sensitive area as well as its operating efficiency, and in practice, a circular ring of solar cells may be provided along the periphery of the watch dial. However, the use of solar cells is optional, and in practice use may be made of non-rechargeable long life miniature lithium cells as the power supply for the timekeeping and radiation monitoring sections of the assembly.

Below radiation display RD on the face of the watch is a radiation detector or sensor 19. This may take the form of a P/N junction diode, a surface barrier diode or transistor detector, so connected as to yield signal pulses at a rate depending on the existing intensity of radiation to which the wearer is exposed. In practice, radiation sensor 19 may be of the type included in the patents referred to in the background section relating to portable radiation monitors, or of the type used in commercially available, battery-operated radiation monitors. Should the voltage requirement for the radiation sensor be higher than the voltage supplied by batteries 18, a solid state voltage step-up integrated circuit chip may be used to raise the battery voltage to a level appropriate to the sensor.

Also provided as part of the assembly is an annunciator transducer or tone alarm generator 20. This is activated to produce an audible warning signal when radiation is sensed or when radiation intensity reaches a dangerous level. Thus, in some situations the wearer of the assembly may not be cognizant of a high radiation condition and he therefore may fail to consult the radiation display on his wrist. But with annunciator 20, an alarm is sounded when radiation is first sensed and increases in intensity as the level becomes hazardous, at which point the wearer can consult radiation display RD to confirm this fact. In practice, the watch may include a miniature speech synthesizer which is arranged to give a verbal warnining in any desired language rather than just a ringing or siren type alarm.

The reverse side of the watch case, as shown in FIG. 2, is provided with a removable hatch cover 21 giving access to a battery compartment or compartments. Secured to the strap component is a flexible wrist sensor 22 which may be a galvanic or moisture-sensitive device, or any other electro-chemical element whose output depends on the varying characteristics of the skin on the wrist of the wearer engaged by sensor 22 when the assembly is strapped thereto.

Referring now to FIG. 3 showing the block diagram of the wrist watch and radiation monitor assembly, it will be seen that the assembly includes two major solid state sections; namely, a timekeeping section TS and a radiation monitoring section RS, both of which are powered by battery source 18. Miniaturized integrated circuits for performing the timekeeping and radiation monitoring functions are housed within the watch case.

Timekeeping section TS includes a piezoelectrical-crystal oscillator which functions as a stable, high-frequency time base 23 whose output is applied to a multistage frequency-divider 24 that divides down the time base frequency to produce low-frequency timing pulses having a repetition rate of one Hz. Thus, in practice the crystal operating frequency may be 32,767 Hz, the divider acting to divide by $2^{15}$ to provide one Hz timing pulses.

The timing pulses from divider 24 are supplied to a pulse processor 25 in which the timing pulses are applied to a seconds counter which is incremented once per second, the output of this counter going to a minutes counter which is rolled over each time the seconds counter goes from 59 to 00. The output of the minutes counter goes to an hours counter which is incremental each time the minutes counter goes from 59 to 00. The output of the hours counter is applied to a date counter which is incremented each time the hours counter goes from 23 to 24. The output of the date counter is applied to a month counter which is incremented each time the date counter goes from 28 to 29, 30 to 31 or 31 to 32, this date counter then resetting to zero. The month counter goes from 1 to 12 and then resets to zero.

The counters of the pulse processor are operatively coupled to a seven segment decoder 26 whose output is applied to the segment drivers of the five LCD stations $S_1$ to $S_5$ of time display TD. The middle segment $S_3$ need not be a seven segment LCD but may be composed of two segments forming a colon.

The means by which the wearer of the solid state watch can selectively produce a time indication or a calendar reading are commonplace and are included in commercially available wrist watches of this type, and will therefore not be disclosed herein. When, as shown in FIG. 4, the time is given on time display TD, the first two stations $S_1$ and $S_2$ present the hour which in this example is 11, and the last two stations $S_4$ and $S_5$ present the minutes which is shown as 05. Middle station $S_3$ presents a colon which in practice may be caused to blink at a one Hz rate to show that the watch is operating.

When, as shown in FIG. 5, the date and month are displayed, the first two stations give the month, which in this instance is 05, and the last two stations give the date, which in this instance is 23, the colon in the middle station separating these indications.

Referring again to FIG. 3, it will be seen that radiation section RS is provided with a microprocessor 27 which in practice may be an integrated circuit chip dedicated to or possessing the memory and date processing functions called for by the invention. In order to provide a reading of radiation intensity, microprocessor 27 receives signal pulses from radiation detector 19 through a selector switch 28, and it counts the number of pulses received during a fixed time interval, such as 30 seconds, as determined by time indicia obtained from the timekeeping section TS through a bilateral link L. Thus, timekeeping section TS acts as a clock for radiation monitoring section RS.

The microprocessor has stored therein radiation intensity level tables which represent those levels which fall within a low intensity or safe range, those which fall below a danger threshold, and those which fall within a high intensity range regarded as hazardous.

The prevailing radiation signal pulse count is compared with the values in the stored tables to provide when the count lies in the low range, an actuating voltage at the output $O_1$ which is applied to the Low station of the radiation display RD. When the pulse count lies in the medium range, an actuating voltage is produced at output $O_2$ which is applied to the Med station, and when the pulse count lies in the high or dangerous range, an actuating voltage is produced at output $O_3$, which is applied to the Hi station.

Alternatively, instead of using LED's for the radiation display RD, three LCD stations may be used which exhibit, when excited through a suitable decoder, the letters, L, M and H to represent the three distinct levels of radiation.

In order to accumulate the radiation dosage to which an individual wearing the watch is exposed, the microprocessor memory stores the values of monitored radiation intensity over a period of time which is initiated by operation of reset switch 16 and is measured by the calendar means in the timekeeping section TS. Then when the assembly is switched to the accumulated dosage mode, a radiation dosage readout is provided on the time display TD which in the example given in FIG. 6 is RD:38, the number 38 standing for RAD's, or whatever unit of radiation measurement is chosen. This dosage presentation is followed by a dosage time interval presentation (not shown) in terms of months and days. For example, if a radiation dosage reading is presented after 5 months and 23 days, the TD reading will then be 05:23. The assembly continues to accumulate the dosage, and whenever it is put into the radiation dosage mode, it gives the dosage accumulated in the time interval indicated.

Thus, in a multi-mode wrist watch and radiation assembly in accordance with the invention, the wearer of the watch is provided with time indications, month and date calendar indications, radiation intensity readings, and cumulative radiation dosage readings, so that the wearer is made cognizant of the radiation exposure at any given time and is also supplied with stress level readings. Consequently, the highly compact instrument worn by the user acts, as it were, as a multi-purpose time and health advisor. It tells the wearer about factors which bear on personal activity, not only in terms of time scheduling, but also in terms of radiation exposure as well as stress and body temperature conditions.

Alarm annunciator 20 is coupled to output $O_3$ of the microprocessor to sound an alarm when the radiation level is at an abnormal level. In practice, the alarm may be constituted by a pulsed solid-state sonic tone generator whose output is supplied to a miniature piezoelectric vibrator to produce high pitched sonic pulses.

Stress detector 22 produces an analog voltage whose magnitude depends on the stress level of the wearer of the watch. In order to convert this voltage to pulses whose repetition rate depends on the stress voltage magnitude, the output of stress detector 22 is applied to a voltage-controlled-oscillator (VCO) 29 whose output is applied to the date input of microprocessor 27 through selector switch 28. Selector switch 28 is a single pole, double throw switch which in one position applies signal pulses from radiation detector 19 to the microprocessor input and in the other position applies pulses from VCO 29 thereto.

When operating in the stress mode, microprocessor 27, which is provided with a stored table of stress values, compares the existing sensed stress therewith to provide an output on a scale of 1 to 10. This output is supplied by link L to the timekeeping section TS to exhibit on the alphanumeric time display TD, as shown in FIG. 7, a stress reading which in the example shown is ST:02, meaning a very low level of stress. Thus, timekeeping section TS cooperates with radiation monitoring section RS to provide a stress reading. This cooperation also exists to provide a cumulative dosage reading. Thus, the two sections are in symbiotic relation.

In practice, the assembly may also incorporate a body temperature sensor such as a thermistor which makes contact with the skin of the wearer to produce an analog value proportional to body temperature. This is converted into a digital value and indicated on the digital display to read, say, 96.8 F.

In the present invention, the microprocessor 27 included in radiation section RS does more than just determine in cooperation with timekeeping section TS the intensity of radiation to which the user is exposed and to thereby provide real time indications thereof, and to determine the accumulated dosage, but it performs other calculating functions in connection with human variables. Hence microprocessor 27 acts as a miniature digital computer.

In a digital computer, the task assigned to a central processing unit (CPU) is to receive and to store for later processing, data in the form of binary digits or bits (0's or 1's), to perform arithmetic or logic operations on this data in accordance with previously-stored instructions, and to deliver the results to the user through a read-out device which in the present invention is constituted by LCD or similar display means.

The central processing unit is that component of the computer which controls the interpretation and execution of instructions. In general, a CPU contains the following elements: "Control" which includes control logic and instructions for decoding and executing the program stored in "memory"; "Registers" which provide control with temporary storage for bits, bytes or words; an Arithmetic and Logic Unit (ALU) that performs arithmetic and logic operations under supervision of control; and Input-Output ports (I/O) providing access to peripheral devices.

A microprocessor is the central processing unit of a computer with its associated circuitry that is scaled down by integrated-circuit techniques to fit on one or more silicon chips containing thousands of transistors, resistors or other electronic circuit elements. By combining a microprocessor with other integrated circuit chips that provide timing (in this case, the chips of the timekeeping section), interfaces for input and output signals and other ancillary functions, one can thereby assemble all of the necessary components of a minicomputer or microcomputer whose master component is the microprocessor. The memory system is that component of the computer which holds data and instruction codes, each instruction or datum being assigned a unique address that is used by the CPU when fetching or storing the information.

The basic "hardware" components of a digital computer are a central processing unit (CPU), a memory system and input-output (I/O) devices, the registers, the control and the arithmetic logic unit of the CPU being linked with the memory system.

The "software" associated with a computer are those expedients by which the computer is explicitly told what to do through a step-by-step sequence of individual instructions which together constitute a program to perform some specific function or to yield a solution to a specific problem. An "instruction" is a group of bits that define a particular computer operation. Thus, an instruction may direct a computer to move data, to do arithmetic and logic operations, to control I/O devices, or to make a decision as to which instruction is to be executed next. In the present arrangement, the program necessary to carry out the functions called for by an assembly in accordance with the invention may be performed by subroutines adapted to perform the specific tasks necessary for the execution of the program.

Other Embodiments

In the assembly shown in FIG. 8, the watch section is of the analog type; hence the display which appears on the dial face 30 is constituted by hour, seconds and minutes hands 31, 32 and 33 which rotate within a circular time scale. The electronics in this instance is similar to that included in the digital watch shown in FIG. 1. However, now the one Hz timing pulses from the frequency divider are applied to a stepping motor which operates a gear train driving the hands.

In the arrangement shown in FIG. 8, the radiation intensity indicator takes the form of the standard symbol universally used for hazardous radiation. It is composed of a central dot 34 and three wedge-shaped segments 35, 36, and 37 radiating from the central dot. These segments are formed by chromatic or reflective-opaque or similar display elements which perform the same function as the low, medium and high or danger radiation indicators in FIG. 1.

That is, when the radiation intensity is low, then all segments are activated by the radiation intensity section of the assembly to provide a "green" indication. When the intensity is at a medium level, all segments are activated to provide a "yellow" signal, and when it is at a high level, all segments are activated to give a "red" signal. The center dot 34, which may be a non-chromatic LCD, and all segments are caused to flicker periodically at a rapid rate when the radiation level to which the wearer is exposed is dangerous. The frequency of pulsations increases with the radiation intensity. A sonic alarm may also be provided as in FIG. 1.

Also, the watch includes a calendar in the form of an alphabetic display 38 giving the day (i.e., Tuesday), an alphabetic display 39 giving the month (i.e., October), and a digital display 40 giving the date (i.e., 5). In addition, two alphabetic displays 41 and 42 are activated to give the prevailing radiation intensity such as HI RAD. A similar type of symbolic radiation display may be used in the digital watch shown in FIG. 1.

In the character analog watch and radiation monitor shown in FIG. 10, the dial face includes a representation 43 of a humanoid character. However, in this instance, the eyes 44 and 45 and the nose 46 are chromatic display elements which when selectively activated indicate low, medium and high radiation intensity levels. And the mouth 47 may be a shaped LCD which is caused to flicker periodically to indicate a danger level of radiation. A character watch assembly of this type is suitable for children who can be quickly taught the significance of the display and the need to escape from any environment having a hazardous level of radiation. Alternatively, the nose or mouth of the character may take the form of the standard symbol used for hazardous radiation as in FIG. 8.

The assembly may also include a nomographic electronic display as shown in FIG. 9 in which the position of a pointer 48 is movable electronically along a linear radiation intensity scale 49 going from Low to Hi and simultaneously from Hi to Lo to provide an escape time reading on the same scale.

Alternatively, one may have a nomographic display for somatic radiation effects and a parallel display for genetic effects. Thus, in an arrangement shown in FIG. 8, one may replace the displays 38 and 41 on the left side of the dial face with one nomographic display and replace displays 39, 40 and 42 on the right side with another nomographic display.

And instead of the wrist watch format illustrated herein, an assembly in accordance with the invention may be in a pocket watch format or in the form of a miniature portable instrument that may be carried by the user or installed (permanently or temporarily) in a motor or any other vehicle, or in the home.

In practice, more than one type of radiation sensor may be used, so as to detect different types of radiation: one sensor being highly responsive to, say, X-radiation, another to nuclear radiation, a third to gamma rays, etc., with a related display that indicates the nature of the sensed radiation and its intensity, thereby covering the entire spectrum of penetrating radiation.

When LCD's are used for alphanumeric or radiation intensity displays, as in the standard symbol format, they may be of the clear or opaque type or of the chromatic type, and they may be caused, when activated, to pulsate at a rate that is a function of radiation intensity.

Thus, the color of an activated display element is indicative of the radiation intensity range (i.e., low, medium or high), whereas the pulse rate reflects the intensity level within that range.

The assembly may also be provided with an ambient smoke-responsive sensor to detect the existence of combustion, say, in a hotel room, this sensor being coupled to the microprocessor or electronic means to provide an alarm which may be in talking form. Thus, a speech synthesizer may be provided which is activated by the microprocessor to call out FIRE. And one may also provide the assembly with a sensor adapted to sense the presence of electromagnetic signals so as to sound an alarm when the wearer is in a radar or microwave environment.

FIG. 11 shows a preferred embodiment of an arrangement in accordance with the invention wherein the circuit of the timekeeping section is linked to and cooperates with the circuit of a radiation monitoring section. But in lieu of a microprocessor as in FIG. 3, the monitoring section is constituted by counters to provide radiation intensity and dosage readings.

The radiation monitoring section is coupled to a radiation detector 50 whose operating voltage is higher than that supplied by a battery 51 for powering the instrument. We shall assume, by way of example, that the battery supply is 3 volts dc and the radiation detector requires 9 volts to operate. To this end, radiation detector 50 is supplied with 9 volts through a solid-state voltage tripler 52. A bias resistor 53 is connected in series with the detector.

Interposed between radiation detector 50 and voltage tripler 52 is a gated power transistor 54 to which periodic gating pulses are applied at, say, 60 Hz, these being derived from an appropriate stage of the frequency divider included in the timekeeping section. Hence the radiation detector is operated at a duty cycle that depends on the pulse rate and pulse width. Thus, a 50 Hz gating signal with a 0.4 millisecond pulse width will result in a 2% duty cycle.

The output of detector 50 is applied through a coupling capacitor 55 to the input of an amplifier 56 having, for example, a gain of 1000. The output of amplifier 56 is fed both to a dose rate counter 57 and a total dose or dosage counter 58 at a logic level appropriate thereto. Dosage counter 58 counts continuously from the instant a reset button 70 is actuated to reset the counter to the time it is again reset. The dosage switch 71 which when actuated provides a dosage readout is shown twice in FIG. 11, once in general form and again in a more detailed circuit form.

In practice, a 2% duty cycle and a 10 microamp amplifier consumption makes feasible a 0.5 milliamp amplifier design. However, this duty cycle which results in a greatly reduced consumption of power also reduces the overall efficiency of the radiation detector to the same degree. Hence a more desirable design can be achieved with a 100 kHz, 10 microamp amplifier and a 100% duty cycle to attain maximum radiation detector efficiency.

Dose rate detector 57 which receives amplified radiation pulsed from amplifier 56 is preferably a ten-stage counter yielding a Lo display output at stage 4 (2 MR/HR level), a Med display output at stage 6 (8 MR/HR level), and a Hi display output at stage 8 (32 MR/HR level).

The Hi output of dosage rate counter 57 is also applied to one input of an AND gate 59 to whose other input is fed a 1024 Hz signal derived from a divide-by-32 stage 60. This stage is coupled to the output of a quartz crystal-controlled oscillator 61 serving as the time base for the timekeeping section, the oscillator operating at a stable frequency of 32,768 Hz. When AND gate 59 is turned on by the Hi output from dose rate counter 57, the 1024 Hz signal then drives an audible alarm 62.

The 1024 Hz output of divide-by-32 stage 60 is fed to a divide-by-1024 stage 63 whose one Hz output provides the one-per-second clock pulses for the timekeeping section. These clock pulses are applied to the main divider 64 which yields 10 seconds, 1 minute, 10 minute, 1 hour, 10 hour and calendar signals. These are applied to a decoder and display driver 65 for operating a six-station LCD digital time and calendar display 66. The timekeeping section of this instrument, as represented schematically by time base 61, stages 60 and 63, main divider 64, driver 65 and digital display 66 are entirely conventional and are found in typical commercially-available digital time display and calendar watches.

In the present arrangement, the one Hz clock pulses from stage 63 of the timekeeping section act to trigger and periodically reset dose rate counter 57 every second to latch the dose rate into a radiation display 67 by way of a latch (I) 67 and a decoder and display driver 68. The predetermined sensitivity of the radiation detector is hardwired into dose rate counter 57 to allow for a direct display of dose rate. The ten stages of dose rate counter 57 are equivalent to 1000 MR/HR.

The dosage accumulated in dosage counter 58 is applied to radiation display 67 by way of a latch (II) 69. The seventeen-station dosage counter 58 allowed for a total of 100 RADS. Operation of reset 70 zeros counter stage 58 and starts total dose recording. A depressible double-pole dosage switch 71 cooperating with gates 72 and 73 coupled to the "enable" terminals of latches (I) and (II) and acts to latch the total dose into radiation display 67 and at the same time to disable the dose rate output of dose rate counter 57. When the dosage switch is depressed a second time, it returns the display to dose rate control.

A two element MR/HR display 74–75 is activated in the MR mode during a total dosage reading, whereas during dose rate reading it is activated in the MR/HR mode. The 5½ digit radiation display with five numeric digits allows for a total of 99,999 MR or 99,999 RADS.

Substrate Arrangement

Referring now to FIGS. 12, 13, and 14, there is shown a preferred substrate arrangement for a timekeeping and radiation monitor assembly in a watch or clock format. The substrate 76 is of dielectric material and in disc form. The diameter of the disc is appropriate to the casing of the watch or clock.

Supported on the back of substrate 76 as shown in FIG. 12 is an $ICM^2$ semiconductor radiation detector 77, a pair of energy cells 78 and 79 and an annunciator 80 to sound an alarm when a dangerous level of radiation is sensed. A 32,768 Hz quartz resonator 81 in a flat back configuration is also mounted on the back of the substrate which is provided at its periphery with control buttons 82, 83, 84 and 85.

Mounted on the rear of the substrate as shown in FIG. 13 is a timekeeping integrated-circuit chip 86 above which is supported a timekeeping liquid crystal display 87. Also mounted on the rear of the substrate is a radiation monitor integrated-circuit chip 88 above which is supported a radiation intensity liquid crystal display 89. At the center of the substrate is a standard radiation symbol display 89.

Thus, all of the components necessary to the timekeeping and radiation monitor assembly are supported on a common substrate. The assembly, when in a watch format, may then be of a diameter and a thickness not much greater than is found in a conventional watch. Or the substrate can be in a larger size appropriate to a clock. The manner in which the components cooperate is set forth in connection with FIGS. 3 and 11.

Clock Format

FIG. 15 shows an assembly in a clock format having an analog display hour constituted by minute and second hands, 90, 91, 92. Also included in the clock is a radiation intensity display 93 in the standard universal symbol form previously described, centered on the clock face to indicate the intensity of radiation in the region of the clock.

The clock may be in a form appropriate for a kitchen, a nursery or elsewhere in the home, or of the type that can be set on a table in the proximity of food to sense whether the food is radioactive. Radioactive contamination is now a problem with produce subjected to radioactive fallous or similar accidents.

Alternatively, the clock may be an automobile clock, a ship clock or a submarine clock. Thus, in a nuclear submarine, a clock in accordance with the invention will detect radiation leakage. Or a clock in accordance with the invention could be used to detect radiation leakage from microwave ovens or other domestic radiation sources.

Radiation detectors are available which are highly directional. Thus, if the detector sensitivity curve in terms of polar coordinates exhibits a maximum response when the source of radiation is due east of the detector, the response will fall off as the detector orientation veers from the east.

This characteristic can be exploited to locate a radiation leak or radioactivity emanating from a given direction. By rotating the assembly which incorporates the radiation detector, one can determine the angular position at which the detected radiation intensity reaches a peak, as indicated on the radiation intensity display. This angular position points in the direction of the radiation source.

While there have been shown and described preferred embodiments of a combined digital and analog timepiece and radiation monitor assembly in accordance with the invention, it will be appreciated that many changes and modifications may be made therein without, however, departing from the essential spirit thereof. Thus, while in the FIG. 11 arrangement there is a separate digital display for time-calendar indications and for radiation indications, a single multi-station display may be used which is operable in a time-calendar indication or in a radiation indicator mode.

I claim:

1. A timepiece and radiation monitor assembly comprising:

A. a case provided with a face;

B. a timekeeping section housed in the case and including a stable high-frequency time base coupled to frequency divider stages from which are derived timing pulses that are applied to a time display mounted on the face whereby the time display presents time indications in an analog or digital format, said divider stages also yielding reset pulses at timed intervals;

C. a radiation detector mounted on or in the case to provide signal pulses whose rate is dependent on the prevailing intensity of penetrating radiation; and D. a radiation monitoring section housed in the case and linked to the timekeeping section which functions as a timing clock therefor, the monitoring section including a resettable electronic dose rate counter responsive to said reset pulses and coupled to the radiation detector for counting the number of signal pulses received during each of said time reset intervals to provide an intensity value whose prevailing level is indicated on a radiation intensity display independent of the time display and also mounted on said face, whereby the assembly provides radiation intensity as well as time indications, said radiation monitoring section further including a manually-settable dosage counter coupled to said radiation detector for continuously counting the signal pulses received from the detector from the instant the dosage counter is reset, a dosage indicator, and a switch which when actuated transfers the count accumulated in the dosage counter to the indicator.

2. An assembly as set forth in claim 1, wherein said time display is an analog display.

3. An assembly as set forth in claim 1, wherein said time display is a multi-station digital display, and said timing pulses are applied to a pulse processor whose output is applied to the digital display.

4. An assembly as set forth in claim 3, wherein said pulse processor in the timekeeping section is provided with counters yielding seconds, minutes, hours, days and months pulses whereby said digital display also provides calendar indications.

5. An assembly as set forth in claim 3, wherein said digital time display is constituted by a series of LCD multisegment stations which are actuated through a pulse decoder coupled to the counters to provide alphanumeric indications appropriate to the data being presented thereby.

6. An assembly as set forth in claim 1, wherein said detector is a P/N junction diode.

7. An assembly as set forth in claim 1, wherein said detector is a surface barrier diode.

8. An assembly as set forth in claim 1, wherein said detector is a transistor.

9. An assembly as set forth in claim 1, wherein said time base is constituted by a piezoelectric crystal oscillator.

10. An assembly as set forth in claim 1, wherein said case is waterproof to permit immersion thereof in a liquid which may be radioactive, said case being immersible to a depth well below sea level.

11. An assembly as set forth in claim 1, wherein said radiation intensity display is constituted by a series of stations each of which when excited produce a different color.

12. An assembly as set forth in claim 11, wherein said stations are constituted by LED's of different colors.

13. An assembly as set forth in claim 11, wherein said stations are constituted by solid state chromatic displays.

14. An assembly as set forth in claim 1 in a wrist watch format provided with strap components to attach the case to the wrist of the wearer.

15. An assembly as set forth in claim 14, further including a stress detector mounted on one of said strap components and coupled to said electronic means selectively in place of said radiation detector to provide on said time display a stress level indication.

16. An assembly as set forth in claim 14, further including a body temperature sensor mounted on one of the strap components and coupled to said electronic means selectively in place of said radiation detector to provide on said time display a temperature level indication.

17. An assembly as set forth in claim 1, wherein said assembly is in a clock format.

18. An assembly as set forth in claim 17, wherein said clock has an analog hand display and said radiation intensity display is in the standard symbol format.

* * * * *